(12) United States Patent
Soulat et al.

(10) Patent No.: US 11,174,781 B2
(45) Date of Patent: Nov. 16, 2021

(54) AIRCRAFT PROPULSION ASSEMBLY EQUIPPED WITH A MAIN FAN AND WITH A LEAST ONE OFFSET FAN

(71) Applicant: SAFRAN AIRCRAFT ENGINES, Paris (FR)

(72) Inventors: Laurent Soulat, Moissy-Cramayel (FR); Kevin Morgane Lemarchand, Moissy-Cramayel (FR); Tewfik Boudebiza, Moissy-Cramayel (FR); Gilles Alain Charier, Moissy-Cramayel (FR); Nathalie Nowakowski, Moissy-Cramayel (FR); Augustin Marc Michel Curlier, Moissy-Cramayel (FR); Adrien Pierre Jean Pertat, Moissy-Cramayel (FR); Pierre-Alain Jean Philippe Reigner, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 265 days.

(21) Appl. No.: 15/764,864

(22) PCT Filed: Oct. 5, 2016

(86) PCT No.: PCT/FR2016/052569
§ 371 (c)(1),
(2) Date: Mar. 29, 2018

(87) PCT Pub. No.: WO2017/060629
PCT Pub. Date: Apr. 13, 2017

(65) Prior Publication Data
US 2018/0266316 A1    Sep. 20, 2018

(30) Foreign Application Priority Data

Oct. 5, 2015 (FR) .................................. 1559452
Oct. 5, 2015 (FR) .................................. 1559480
Nov. 16, 2015 (FR) .................................. 1561014

(51) Int. Cl.
*F02C 3/10* (2006.01)
*B64D 27/12* (2006.01)
(Continued)

(52) U.S. Cl.
CPC ................ *F02C 3/10* (2013.01); *B64D 27/12* (2013.01); *B64D 27/18* (2013.01); *B64D 27/26* (2013.01);
(Continued)

(58) Field of Classification Search
CPC .. F02C 3/10; F02C 3/107; F02C 3/113; F02C 7/36; B64D 27/12; B64D 27/18;
(Continued)

(56) References Cited

U.S. PATENT DOCUMENTS 3,054,577 A    9/1962  Wolf et al.
7,752,834 B2 *  7/2010  Addis .................... B64D 27/10
                                                    244/60
(Continued)

FOREIGN PATENT DOCUMENTS

GB        2400411 A    10/2004

OTHER PUBLICATIONS

International Search Report from corresponding French application No. PCT/FR2016/052569 dated Jan. 30, 2017.

*Primary Examiner* — Craig Kim
(74) *Attorney, Agent, or Firm* — Womble Bond Dickinson (US) LLP

(57) ABSTRACT

The present invention relates to a powerplant of an aircraft including at least one twin-spool gas generator of longitudinal axis (XX), at least one main fan arranged upstream of the gas generator on the longitudinal axis (XX) and driven in rotation by the gas generator, the main fan being shrouded (Continued)

with a main fan housing; and at least one auxiliary fan with axis (XY, XY') offset relative to the longitudinal axis (XX) and driven by the gas generator, the auxiliary fan being shrouded with an auxiliary fan housing, the gas generator including at least one low-pressure compressor and a low-pressure turbine connected by a low-pressure shaft, the low-pressure turbine driving in rotation the main fan and the auxiliary fan via at least one power transmission system including a differential gear system incorporating a bevel gear.

15 Claims, 9 Drawing Sheets

(51) Int. Cl.
| | | |
|---|---|---|
| *B64D 35/04* | (2006.01) | |
| *F02K 3/062* | (2006.01) | |
| *F01D 15/12* | (2006.01) | |
| *F02C 3/107* | (2006.01) | |
| *F02C 7/36* | (2006.01) | |
| *F02K 3/06* | (2006.01) | |
| *B64D 27/18* | (2006.01) | |
| *B64D 27/26* | (2006.01) | |

(52) U.S. Cl.
CPC ............. *B64D 35/04* (2013.01); *F01D 15/12* (2013.01); *F02C 3/107* (2013.01); *F02C 7/36* (2013.01); *F02K 3/06* (2013.01); *F02K 3/062* (2013.01); *B64D 2027/266* (2013.01); *F05D 2220/323* (2013.01); *F05D 2220/36* (2013.01); *F05D 2240/14* (2013.01); *F05D 2240/40* (2013.01); *F05D 2240/60* (2013.01); *F05D 2250/312* (2013.01); *F05D 2260/40311* (2013.01)

(58) Field of Classification Search
CPC . B64D 27/26; F02K 3/06; F02K 3/062; F02K 3/065
See application file for complete search history.

(56) References Cited

U.S. PATENT DOCUMENTS 8,402,740 B2 *  3/2013  Guemmer .............. B64D 27/12
                                                244/53 R
2006/0011780 A1 *  1/2006  Brand .................... B64D 35/04
                                                244/60
2013/0223991 A1 *  8/2013  Suciu ...................... F01D 15/12
                                                415/122.1

\* cited by examiner

AIRCRAFT PROPULSION ASSEMBLY EQUIPPED WITH A MAIN FAN AND WITH A LEAST ONE OFFSET FAN

FIELD OF THE INVENTION

The present invention relates to the aeronautical field and relates to a powerplant comprising at least two fans driven by one and the same gas generator. It relates in particular to a fan arranged following the gas generator and at least one fan that is offset relative to the axis of the gas generator.

PRIOR ART

The present applicant has undertaken work on a powerplant architecture with at least two distributed fans. The aim is to achieve optimization of the propulsive efficiency owing to a high by-pass ratio, i.e. the ratio of the secondary airflow passing through the fan or fans to the primary airflow passing through the central body with the combustion chamber and the turbines, while maintaining acceptable ground clearance and fans of reduced size having operating conditions different from those of the turbine. An example of a powerplant with offset fans is known from documents EP 2 574 546 and GB 2 400 411.

In the case of conventional turbojets with a turbine connected to the fan directly, the by-pass ratios are limited by the peripheral tip speed of the fan blades. Architectures with a fan driven via a speed reducer—or UHBR (ultrahigh by-pass ratio) respond partially to this problem by optimizing the efficiency of the turbine in moderate fan operating conditions.

One solution for continuing to increase the by-pass ratio without compromising the established rules in terms of integration is to distribute the propulsion over several fan modules of more modest dimensions. A basic diagram of such an assembly 1 is shown in FIG. 1. A gas generator 3 conventionally comprises a compression unit supplying air to an annular combustion chamber; the gases leaving the chamber drive one or more turbines connected mechanically to the compressor, in this case a power turbine 5. The latter is integral with a power shaft 6 concentric with the gas generator 3. This power shaft 6 drives, via a suitable transmission system, two intermediate radial shafts each driving an offset fan shaft 9, 9', i.e. with axis displaced relative to the axis of the gas generator. The fan shafts 9 and 9' each drive a fan 10, 10' with axis offset relative to that of the engine. Such an arrangement makes it possible to achieve the aforementioned aims.

However, production of a transmission system of this type is complex. The jet from the gas generator "shears" the air directly at ambient temperature and generates a loud noise characteristic of fighter aircraft with low by-pass ratio or monoflow. There is also the fact that the gas generator is very exposed to ingestion of foreign bodies, in contrast to the conventional architecture where the latter is protected by a fan.

The present invention aims to rectify this problem.

In particular, it aims to provide an arrangement that makes it possible to preserve a known architecture while increasing the by-pass ratio.

SUMMARY OF THE INVENTION

This aim is achieved with a powerplant of an aircraft comprising:

- at least one twin-spool gas generator with a longitudinal axis;
- at least one main fan arranged upstream of the gas generator on the longitudinal axis and driven in rotation by the gas generator; and
- at least one auxiliary fan with axis offset relative to the longitudinal axis and driven by the gas generator, the gas generator comprising at least one low-pressure compressor and a low-pressure turbine connected by a low-pressure shaft, the low-pressure turbine driving in rotation the main fan and the auxiliary fan via at least one power transmission system comprising a differential gear system incorporating a bevel gear.

Thus, this configuration makes it possible to simplify the design of a distributed propulsion unit while preserving a known architecture in which at least one additional fan module is incorporated.

The assembly according to the invention may comprise one or more of the following features, taken separately from one another or in combination with one another:

- the differential gear system comprises a planetary gear train comprising at least one ring gear driving the main fan and a planet carrier driving the auxiliary fan.
- the power transmission system comprises a second power transmission system comprising the differential gear system arranged between the gas generator and the main fan.
- the power transmission system comprises a first power transmission system connected to the auxiliary fan, the second power transmission system being connected to the first power transmission system.
- the auxiliary fan is driven by the low-pressure turbine via an intermediate layshaft.
- the intermediate layshaft comprises a first shaft and a second shaft, which are joined together by a coupling.
- the main housing of the main fan is separate and distinct from the auxiliary housing of the auxiliary fan so as to generate a main secondary airflow and an auxiliary secondary airflow, respectively, which are independent until they are discharged to atmosphere.
- the powerplant comprises stator blades arranged downstream of the main fan, the stator blades each having a top end fixed to the fan housing and a structural nature of transmission of forces so as to hook up the first or the second power transmission system.
- the main fan and the gas generator form a turbine engine, the turbine engine being fixed under the wing and the auxiliary fan being fixed on the wing, the axis of the turbine engine and of the auxiliary fan being located in one and the same vertical plane.
- the powerplant comprises two auxiliary fans driven by the low-pressure turbine.
- the turbine engine is a multiflow turbojet.
- the turbine engine and the auxiliary fan are mounted on the wing by means of a pylon.
- the powerplant comprises at least one turbine engine and a propeller.
- the propeller comprises the auxiliary fan.
- the powerplant comprises at least one auxiliary turbine mounted on the longitudinal axis.
- the auxiliary turbine is independent of the main turbine.
- the main fan and the gas generator form a turbine engine.
- the auxiliary turbine comprises a free power turbine driven by the gas generator and driving in rotation the auxiliary fan.
- the auxiliary fans are driven respectively by an auxiliary turbine.

the differential gear system comprising a housing, an axial input shaft, a planet carrier driven by the input shaft, planet gears mounted on the planet carrier, at least one transmission gear wheel supported by the housing and radial shafts each perpendicular to the axial input shaft, the radial shafts being integral with the sun gears, the planet carrier and the input shaft being coaxial, the planet carrier forming a hub on which the rotation axes of the planet gears are arranged radially.

the first power transmission system comprises a reduction gearbox.

the reduction gearbox of the first power transmission system is an epicyclic mechanism.

the first and/or the second power transmission system(s) comprise(s) in series two double universal joints with a slide connection.

the first and/or the second power transmission system is located in an engine zone that is not thermally stressed, notably upstream of the gas generator.

the first and/or the second power transmission system(s) is/are located downstream of the turbine.

the turbine engine is fixed under the wing.

the auxiliary fan is fixed on the wing.

the turbine engine and the auxiliary fan are fixed under the wing.

the turbine engine and/or the auxiliary fan is/are equipped with thrust reversing means.

at least the turbine engine or the auxiliary fan that is mounted on the wing comprises thrust reversing means able to deflect the air stream passing through it at least upwards and/or sideways.

at least the auxiliary fan or the turbine engine that is fixed under the wing comprises thrust reversing means able to deflect the air stream passing through it at least partly sideways.

The invention also relates to a powerplant of an aircraft comprising:
at least one main turbine mounted along a longitudinal axis;
at least one main fan arranged on the longitudinal axis and driven in rotation by said main turbine;
at least one auxiliary turbine mounted on the longitudinal axis, the auxiliary turbine being independent of the main turbine; and
at least one auxiliary fan with axis offset relative to the longitudinal axis and driven by the auxiliary turbine.

The invention also relates to a powerplant of an aircraft comprising:
at least one turbine mounted along a longitudinal axis;
at least one main fan arranged on the longitudinal axis and driven in rotation by said turbine;
at least one auxiliary turbine mounted on the longitudinal axis;
at least one auxiliary fan with axis offset relative to the longitudinal axis and driven by the auxiliary turbine, the auxiliary fan being connected to a first power transmission system; and
a second power transmission system connected to the first power transmission system, the second power transmission system being arranged:
downstream of the auxiliary turbine between the auxiliary turbine and the auxiliary fan,
or upstream of the auxiliary turbine between the auxiliary fan and the main fan.

When a second power transmission system is arranged downstream of the turbine driving the main fan, and when the main and auxiliary fans are driven by different, independent turbines, the latter are torque-unloaded. When the second power transmission system is arranged upstream of the gas generator this allows its integration to be facilitated, as it is a zone where the stresses due to the thermal conditions (operating temperature, expansion of components, etc.) are far lower.

The invention also relates to an aircraft comprising a fuselage, two wings on either side of the fuselage, at least two powerplants, each fixed to one of the wings, said powerplants comprising at least one turbo-engine and a propeller, one of them being fixed under the wing, and the other fixed on the wing, in particular the axes of the turbo-engine and of the propeller being located in one and the same vertical plane.

The invention also relates to an aircraft comprising:
a wing comprising a first upstream spar and a second downstream spar extending in the direction of the wingspan of said wing; and,
at least one powerplant supported by the wing, said powerplant comprising a turbo-engine and a propeller, the propeller comprising an outer annular housing fixed at least to the first upstream spar via at least one first and one second attachment.

BRIEF DESCRIPTION OF THE FIGURES

Other features and advantages will become clearer from the following description of non-limiting embodiments of the invention, referring to the appended drawings, in which.

DETAILED DESCRIPTION OF AN EMBODIMENT OF THE INVENTION

Figure 2:
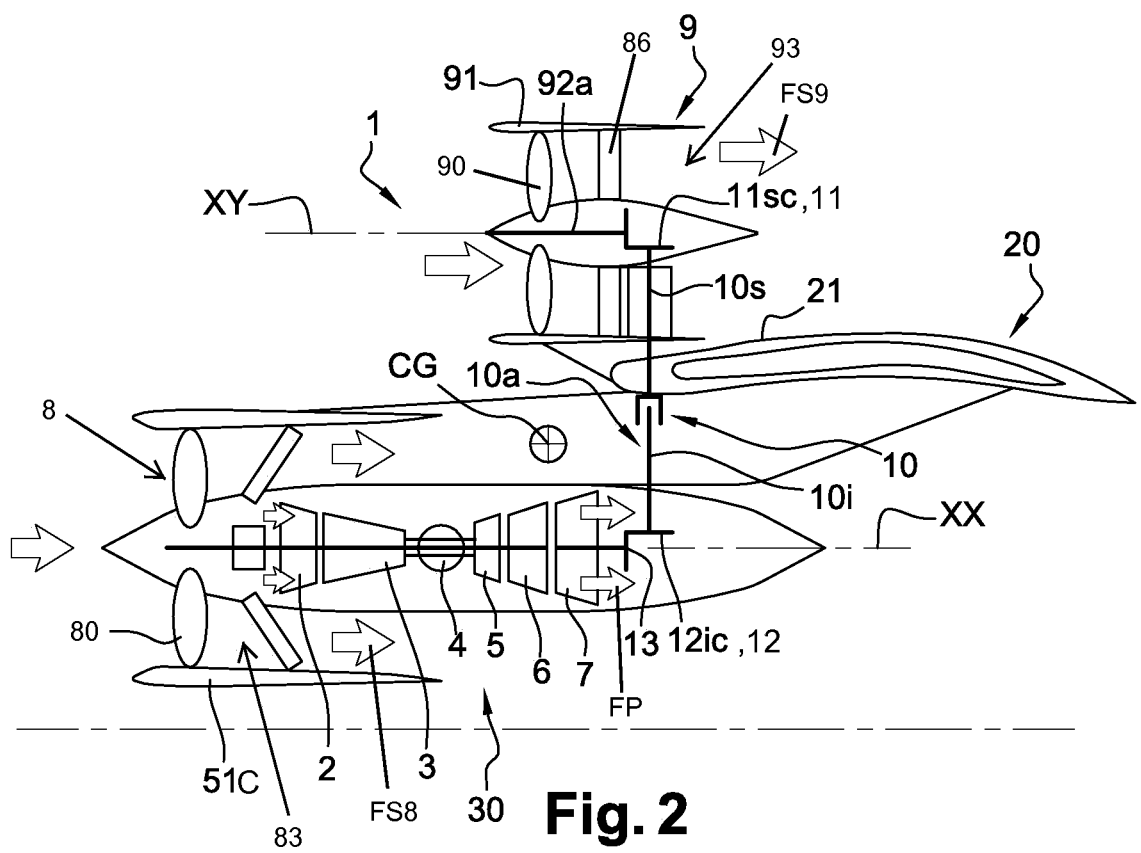
FIG. 2 is a schematic representation of an axial sectional view of a first embodiment of the arrangement of an auxiliary fan module driven by an auxiliary turbine.
Figure 12:
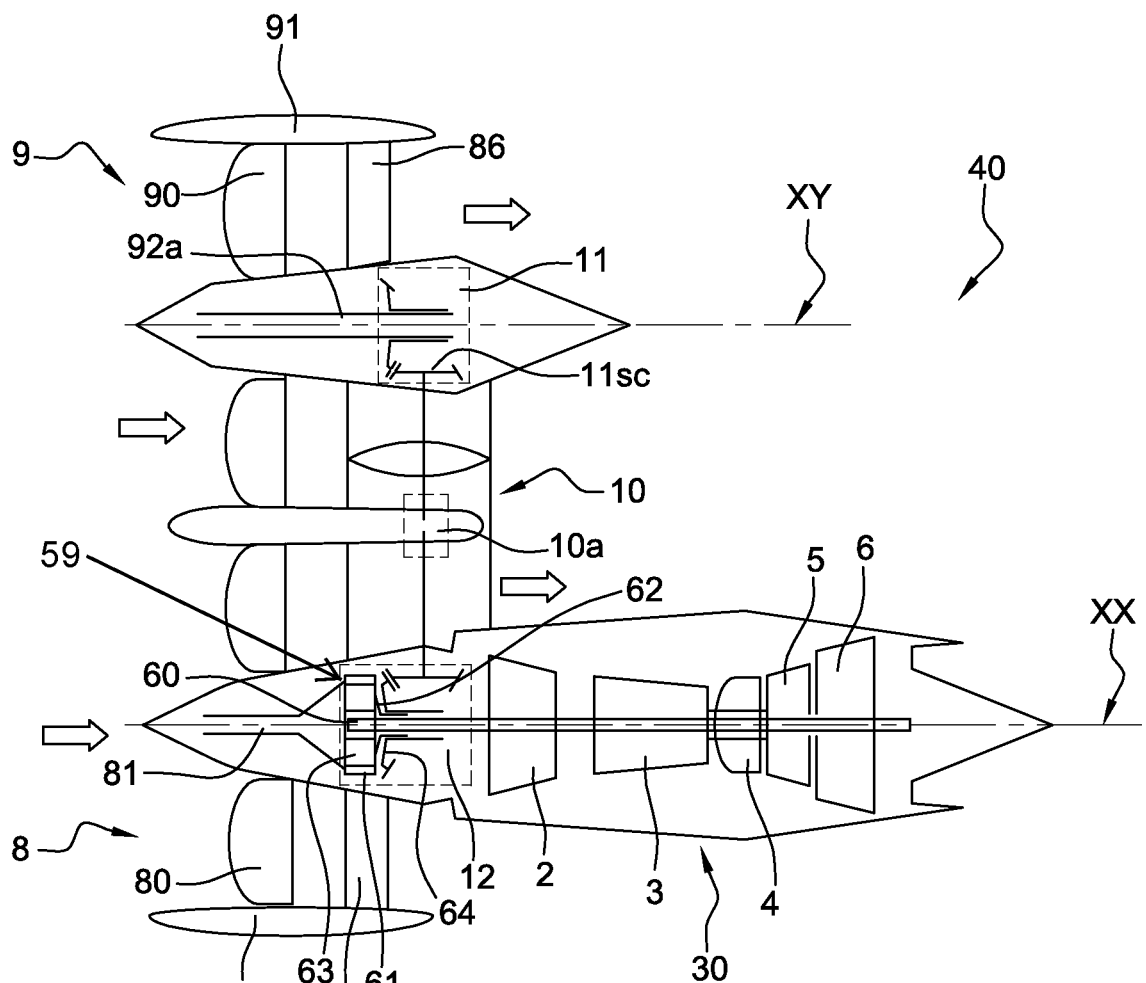
FIG. 12 is a schematic representation of an axial sectional top view of another embodiment of the arrangement of main and auxiliary fan modules driven by a gas generator.

FIGS. 2 and 12 show a powerplant 1 of an aircraft. The powerplant 1 is shown mounted on the wing 20 or aerofoil of an aircraft as illustrated in FIG. 2. The aircraft comprises at least two such powerplants, one on each wing 20.

Here, the powerplant 1 comprises a turbojet 40 comprising a gas generator 30 of longitudinal axis XX. Of course, the invention may apply to other types of turbine engine. The gas generator 30 comprises, along the longitudinal axis XX and from upstream to downstream, a low-pressure (LP) compressor 2, a high-pressure (HP) compressor 3, a combustion chamber 4, a high-pressure (HP) turbine 5 and a low-pressure (LP) turbine 6. In the present invention, and generally, the terms "upstream" and "downstream" are defined relative to the circulation of the gases in the powerplant or else relative to the direction of movement of the aircraft in flight. Moreover, the terms "lower" and "upper" are defined relative to a radial axis perpendicular to the axis XX and with respect to the distance relative to the longitudinal axis XX. The LP compressor and the LP turbine are connected together by a low-pressure (LP) shaft to form a low-pressure spool. The HP compressor and the HP turbine are connected mechanically by a high-pressure (HP) shaft to form a high-pressure spool. The HP and LP spools form the gas generator 30, which in this case is a twin-spool gas turbine engine. The LP and HP spools are coaxial and are mounted rotatably and independently. The combustion chamber 4 is supplied with the compressed air from the compressors 2 and 3 in series. The gases produced in the combustion chamber 4 successively set in motion the HP turbine 5 and the LP turbine 6, which drive the HP compressor 2 and the LP compressor 3, respectively.

The turbojet 40 comprises a so-called main fan 8 upstream of the gas generator 30 and on the longitudinal axis of the latter. The main fan 8 comprises an annular arrangement of fan blades 80 around a fan shaft 81. The main fan 8 is shrouded by a main fan housing 51C illustrated in more detail in FIG. 2. The LP turbine 6, called the main turbine here, drives the shrouded main fan 8. The shrouded main fan 8 comprises a rotor supported by the shaft of the LP turbine with blades at the periphery of the rotor.

The main fan 8 compresses the air entering the powerplant 1, which is split into a primary airflow circulating in a primary channel that goes through the gas generator 30 and a secondary airflow, called the main airflow, circulating in a secondary channel 83 around the gas generator 30. The secondary channel 83 is formed by the housing 51C and a housing for the gas generator 30.

In this case the secondary channel downstream of the fan 51 is short. The secondary airflow FS8 of the main fan and the primary airflow FP, the latter forming the gases produced by the combustion chamber, are separate, the two streams are ejected into the atmosphere by separate concentric ejection nozzles (not shown). The turbojet 40 could, however, have mixed airflows, the two streams being mixed upstream of the nozzle for ejection of the gases.

According to the invention, the powerplant 1 comprises a propeller. According to the embodiments shown in particular in FIGS. 2 and 12, it is another fan 9, called auxiliary, which is mounted on an axis XY offset relative to the longitudinal axis XX. The term "displaced" or "offset" means that the axes XX and XY are not coaxial. The auxiliary fan 9 also comprises an annular arrangement of fan blades 90 around a fan shaft 92a. The fan 9 has a housing 91, called auxiliary fan housing, as can be seen in FIGS. 2 and 12. In the present embodiment, the axis of the fan 9 is parallel to that of the gas generator 30.

The auxiliary fan 9 generates a secondary airflow FS9, called auxiliary, which circulates in the housing 91 through an auxiliary secondary channel 93, around the fan hub through which the fan shaft 92a passes, as represented by the arrows in FIGS. 2 and 12. This auxiliary secondary airflow FS9 is ejected into the atmosphere by an ejection nozzle downstream of the housing 91. The housing 91 of the auxiliary fan 9 is independent and separate from the housing 51C of the auxiliary fan housing. It will thus be understood that the main and auxiliary secondary airflows FS8, FS9 are independent until they are ejected into the atmosphere. This makes it possible to optimize the aerodynamic efficiency of each turbine and of each fan independently. The overall efficiency of the powerplant is thus improved.

In particular, the rotor of the fan is driven in rotation by an intermediate layshaft 10. The latter is, in this example, made in two parts. In particular, the intermediate shaft comprises a first intermediate shaft 10i, located in the lower part and a second intermediate shaft 10s located in the upper part. The two parts are connected to one another by a suitable coupling 10a. This coupling allows easy dismantling of the two parts of the intermediate shaft. It can also ensure transmission of movement in case of misalignment resulting from deformations in the structure that might occur in flight. Of course, the rotor may be driven by a one-piece intermediate shaft 10.

According to the embodiment illustrated in FIG. 2, the powerplant comprises a free power turbine 7, called auxiliary turbine, which is mounted downstream of the LP turbine 6. The free power turbine 7 is driven in rotation by the gases of the primary airflow of the gas generator 30 independently of the LP and HP spools. This free power turbine 7 is integral with a power shaft 13 coaxial with the longitudinal axis XX and drives the latter in rotation.

The second shaft 10s of the intermediate shaft 10, in the upper part, is driven in rotation by the output shaft 13 of the free power turbine 7 via a first power transmission system 11. Advantageously, but not exhaustively, this first power transmission system 11 comprises a bevel gear 11sc in mesh with the drive shaft 92a of the auxiliary fan 9. At the other end, the first shaft 10i of the intermediate shaft 10 interacts with a second power transmission system 12. Advantageously, but not exhaustively, the second power transmission system 12 comprises a bevel gear 12ic in mesh with the shaft 13 of the free power turbine. The first shaft 10i of the intermediate shaft 10 is driven in rotation by the shaft 13. Bevel gear systems make it possible to simplify the integration of the various modules. The bevel gear inside the auxiliary fan makes it possible to perform speed changes between input shafts and output shafts with a step-up ratio between 0.5 and 1.5.

The turbine engine formed by the turbojet supplies part of the thrust on the aircraft by the combination of primary airflow and secondary airflow that is produced. The free power turbine 7 drives in rotation the fan rotor 9 via the intermediate shaft 10 and the first and second power transmission systems.

This powerplant 1 is shown mounted on the wing 20 of an aircraft with the auxiliary fan 9 above the wing 20 and the main fan 8 under the wing 20. The assembly comprises a turbojet suspended from a pylon under the wing in front relative to the leading edge of the wing. Of course, the auxiliary fan 9 is mounted on the wing by means of a pylon 21 or any other equivalent structure forming a support for the fan on the wing 20. The auxiliary fan 9 may project above the wing or else be flush with the wing depending on the aerodynamic conditions required. According to this representation, the plane of rotation of the auxiliary fan 9 is upstream of the leading edge of the wing 20.

Relative to an arrangement in the prior art where the offset auxiliary fan would be at the same axial level as the fan 8 of the turbojet 40, the centre of gravity CG of the powerplant is displaced downstream, since the offset auxiliary fan 9 is downstream relative to fan 8. This arrangement is favourable in terms of stability in flight.

The axes of the turbojet 40 and of the auxiliary fan 9 are advantageously in the same vertical plane, which is favourable from the standpoint of stability in flight as the thrust forces are in the same vertical plane. It is thus observed that the by-pass ratio is increased relative to that of the turbojet but without affecting the ground clearance.

Figure 11:
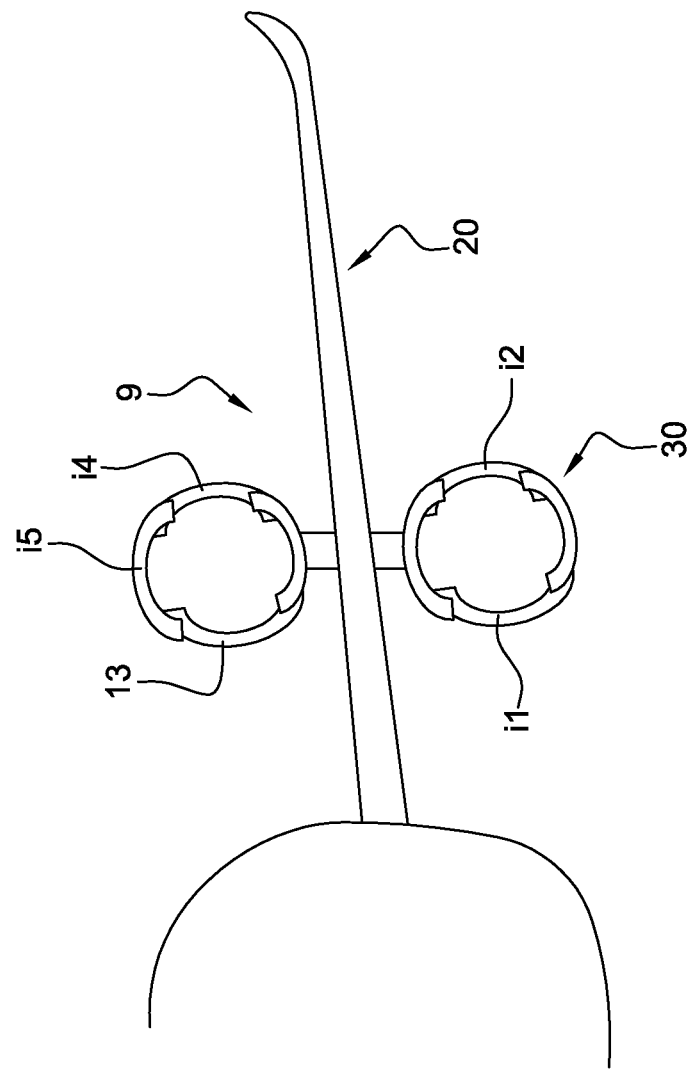
FIG. 11 is a schematic diagram of an installation of the powerplant in FIG. 2 in front view.

Another advantage of this solution is that the powerplant comprises thrust reversing means. These thrust reversing means comprise thrust reverser doors as shown in FIG. 11. Here, the thrust reverser doors are arranged in five sectors on the turbojet without any risk of interference of the reversed airflows with a surface of the aircraft. In FIG. 11, at i1 or i2, the two sectors are lateral and make it possible to generate reversed airflows, free from interference with the fuselage, the wing 20 or the ground.

It is also possible to arrange the thrust reverser doors on the auxiliary fan 9. Here, referring to FIG. 11, three orientations are possible: two lateral, i3 and i4, and one upwards, i5.

Figure 13:
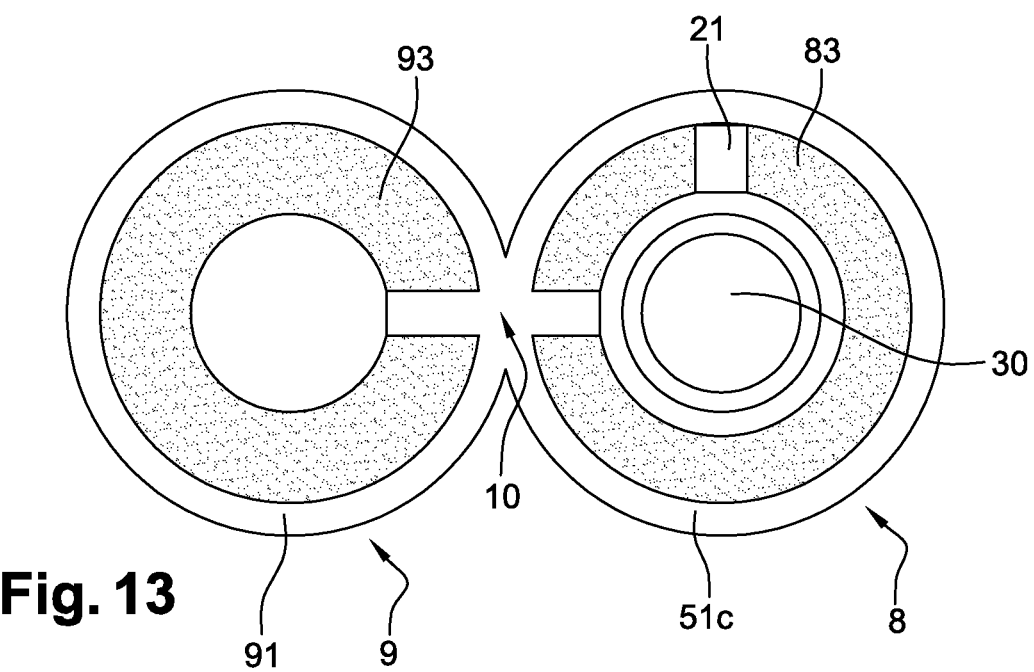
FIG. 13 is a radial section of the powerplant shown schematically in FIG. 12.

FIGS. 12 and 13 illustrate another embodiment of a powerplant 1 with a main fan 8 along the axis of the gas generator 30 and an auxiliary fan 9 with axis offset relative to the axis of the gas generator 30. The corresponding numerical references of the powerplant described in the foregoing in the first embodiment are retained in the rest of the description. The low-pressure turbine 6 drives in rotation the shrouded main fan 8 arranged upstream of the gas generator 30. In this example, the LP turbine is an auxiliary turbine. The low-pressure turbine 6 also drives the offset auxiliary fan 9. The main fan and the auxiliary fan are driven via at least one power transmission system comprising a differential gear system incorporating a bevel gear. For this, the auxiliary fan 9 is driven via an intermediate shaft 10 that extends radially relative to the low-pressure turbine 6. The intermediate shaft 10 comprises, similarly to the embodiment illustrated in FIG. 2, a first shaft 10i and a second shaft 10s connected by a coupling 10a allowing the misalignments. The second shaft 10s is driven in rotation via the shaft of the low-pressure turbine through a first power transmission system 11. Advantageously, but not exhaustively, this first power transmission system 11 comprises a bevel gear 11sc in mesh with the shaft 92a of auxiliary fan 9. At the other end, the first shaft 10i interacts with a second power transmission system 12 and is also driven by the low-pressure turbine. The second power transmission system 12 comprises a differential gear system. The differential system comprises a planetary gear train in this example. This differential makes it possible to reduce the speed of the outputs. The planetary gear train comprises a sun gear 60, a ring gear 61, a planet carrier 62 and planet gears 63. As illustrated in FIG. 12, the shaft of the low-pressure turbine 6 is in mesh with the sun gear 60 that forms the input of the reduction gearbox. The axis of the sun gear 60 is centred on the axis of the low-pressure turbine 6. The planet gear is in mesh with a planet gear 63. The latter engages on the ring gear 61 that drives the shaft 81 of the main fan 8. The planet carrier 62 is also mounted coaxially with the shaft of the low-pressure turbine. The planet carrier 62 is connected to the first shaft 10i so as to drive the auxiliary fan 9. The planet carrier 62 is also centred on the shaft of the low-pressure turbine 6. Moreover, the planet carrier 62 is coupled to a bevel gear 64 which is in mesh with the first shaft 10i of the intermediate layshaft connected to the auxiliary fan shaft 9. Finally, the planet carrier is connected to the gear 64 downstream of the planetary gear train by a spline coupling.

The planet gears 63 may be double helical gears. In this case, there is blocking of the degree of freedom in translation on the axis of the fan between the various components of the reduction gearbox. To avoid large internal stresses on axial expansion of the surroundings under thermal load, the degree of freedom in axial translation is restored between each component. For example, for this purpose it is possible to use guidance of the planet gears by plain bearings without and axial stop and fan rotor/ring gear linkage effected using a spline that is not blocked axially and therefore slides on the axis of the fan.

According to another embodiment, these planet gears are spur teeth gears. The degree of freedom in axial translation is maintained between sun gear/planet gears and planet gears/ring gear. In this case it is not necessary to use sliding splines and preference may be given for example to the use of ball bearings for planet gear guidance.

In the embodiment described above, the auxiliary fan and the main fan are arranged in a horizontal, axial plane, rather than vertical. The fans and the gas generator are arranged under the wing of the aircraft via a pylon 21.

The powerplant also comprises stator blades 86, also called outlet guide vanes (OGV). These stator blades 86 extend approximately radially in the secondary channel 83 and 93 of the main fan 8 and auxiliary fans 9, 9' as illustrated in FIGS. 2 and 12. These stator blades extend upstream of the inlet of the gas generator. The stator blades 86 have an aerodynamic profile to deflect the main and auxiliary secondary airflow generated respectively by the main and auxiliary fans. They are also of a structural nature of transmission of forces. In particular, the stator blades 86 notably allow the transmission of the forces originating from the fans 8, 9 and from the power transmission systems. The stator blades 86 are distributed uniformly around the axis of the shaft of the main fan. They are also distributed uniformly around the axis of the shaft of the auxiliary fan. The latter each have a bottom end and a radially opposite top end. The stator blades 86 of the main fan are fixed by their top ends to a collar of the main housing 51C and by their bottom ends to a collar of the housing of the gas generator 30. In the case of the stator blades 86 of the auxiliary fan 9, they are fixed by their top ends to a collar of the auxiliary housing 91 and by their bottom ends to the fan hub. These stator blades 86 are necessary for hooking up the power transmission systems 11, 12 ensuring distribution of power, with bevel gears.

According to a variant embodiment that is not illustrated, the first power transmission system 11 further comprises a linkage comprising a first and a second double universal joint of the pin swivel type connected by a slide connection. The first joint is connected to the intermediate shaft, whereas the second joint is connected to the fan rotor. This combination makes it possible to take up the angular displacements between the axial and radial displacements of the intermediate shaft.

Advantageously, but not exhaustively, the joint or joints may be a Rzeppa joint. Such a joint comprises a drive shaft and a driven shaft; an inner race is integral with one shaft and an outer race is integral with the other shaft with interposition of balls. The mutual arrangement of these elements is such that it allows the driven shaft to be driven at the same rotary speed as the input shaft while allowing angular misalignment between them.

Advantageously, but not exhaustively, the joint or joints may be a sliding VL joint that is known per se. This joint comprises a drive shaft and a driven shaft. Balls retained in a cage are movable in crossed grooves, outer and inner respectively. The grooves allow axial displacement of one shaft relative to the other while ensuring torque transmission. The second joint may also be a Rzeppa joint. There is then sliding connection between the two joints, for example by means of sliding splines.

According to a variant embodiment, the intermediate layshaft or connecting shaft 10 between the main fan and the auxiliary fan module may be inclined at an angle between −45° and +45° relative to the axes of the driving and receiving elements. This configuration makes it possible to adjust the axial position of the auxiliary fan module relative to the main fan and the gas generator.

It will be understood that these variant embodiments of the first power transmission system 11 may apply to the second power transmission system 12. According to yet another variant embodiment of the invention, the first power transmission system may also comprise a reduction gearbox. In particular, the auxiliary fan 9 is driven by its fan shaft which is itself driven via a reduction gearbox supported on shaft 10. The reducer is preferably a planetary gear train with a sun gear, a ring gear and planet gears. The planet gears are supported by a fixed chassis, attached to the housing of the powerplant. The wheels forming the planet gears mesh on the one hand with the teeth of the planet gear and on the other hand with the teeth of the ring gear. The sun gear is in mesh with the set of planet gears, the number of which depends on the size of the reducer, the reduction ratio and the input torque.

These planet gears are double helical teeth gears or spur teeth gears.

The shaft element of the fan 9 is in engagement, at the input of the reducer, with the sun gear and, at the output, the fan shaft is driven by the ring gear, to which it is rigidly connected. The shafts arranged along the axis XY, supported by sets of ball or roller bearings on the fixed structure of the powerplant, are in this case coaxial in the direction XY, which is parallel and offset relative to the direction XY of the shaft 13.

The reducer may be a flat or spherical reducer.

Figure 3:
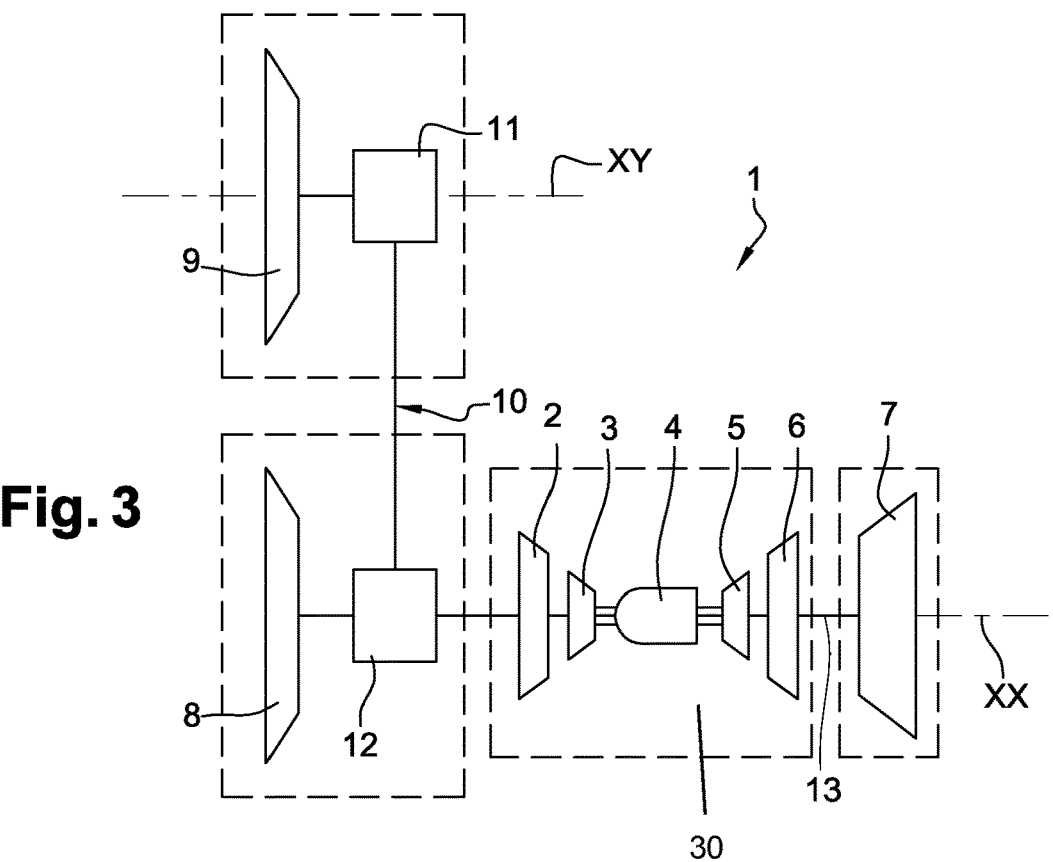
FIG. 3 is a schematic representation of a second embodiment of the arrangement of an auxiliary fan module in a standard architecture.

FIG. 3 shows another embodiment of a powerplant. The elements identical to those in FIG. 2 are denoted by the same numerical references. The powerplant comprises a gas generator 30. The latter comprises an LP spool and an HP spool mounted rotatably, independently on the longitudinal axis XX. The LP spool comprises an LP compressor and an LP turbine connected by a low-pressure shaft. An HP compressor and an HP turbine are arranged between the latter, forming the HP spool. The HP and LP spools form the gas generator. In this case it is a twin-spool gas turbine engine. In this example, a main fan 8 is mounted upstream of the LP compressor 2, or of the gas generator, along axis XX. An auxiliary fan 9 is also arranged along an axis XY offset relative to the longitudinal axis XX. The auxiliary fan 9 is driven by the power shaft of the free power turbine 7 via a first power transmission system 11 arranged between the main fan and the auxiliary fan 9. The first power transmission system 11 and the auxiliary fan 9 form a fan module.

The main fan 8 is also driven by the turbine 6 by means of a second power transmission system 12. Of course, the auxiliary fan and the main fan may be driven by the same free power turbine.

Figure 1:
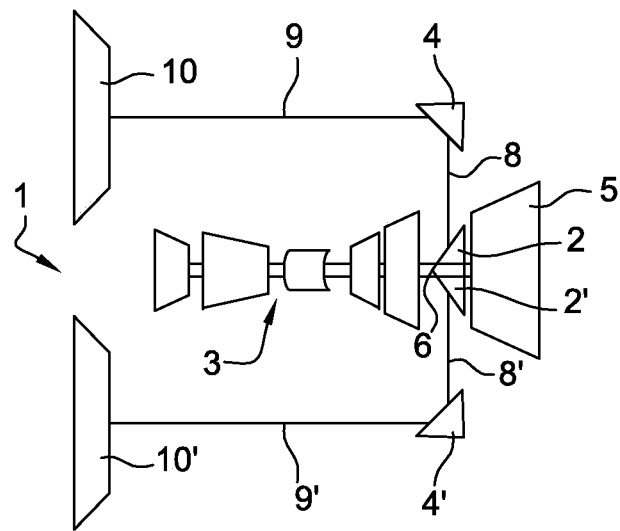
FIG. 1 is a schematic representation of an aircraft powerplant architecture according to the prior art.

The first power transmission system 11 and the second power transmission system 12 are similar to those disclosed in the first embodiment illustrated in FIG. 1. The first and second transmission systems 11, 12 make it possible to effect an angular offset and optionally reduce the speed or distribute torques over several outputs. These first and second power transmission systems are arranged upstream of a plane perpendicular to the axis XX and upstream of the gas generator. The auxiliary fan is also arranged upstream of this plane. The air intakes of the main and auxiliary fans are arranged roughly in one and the same plane perpendicular to the axis XX.

Figure 4:
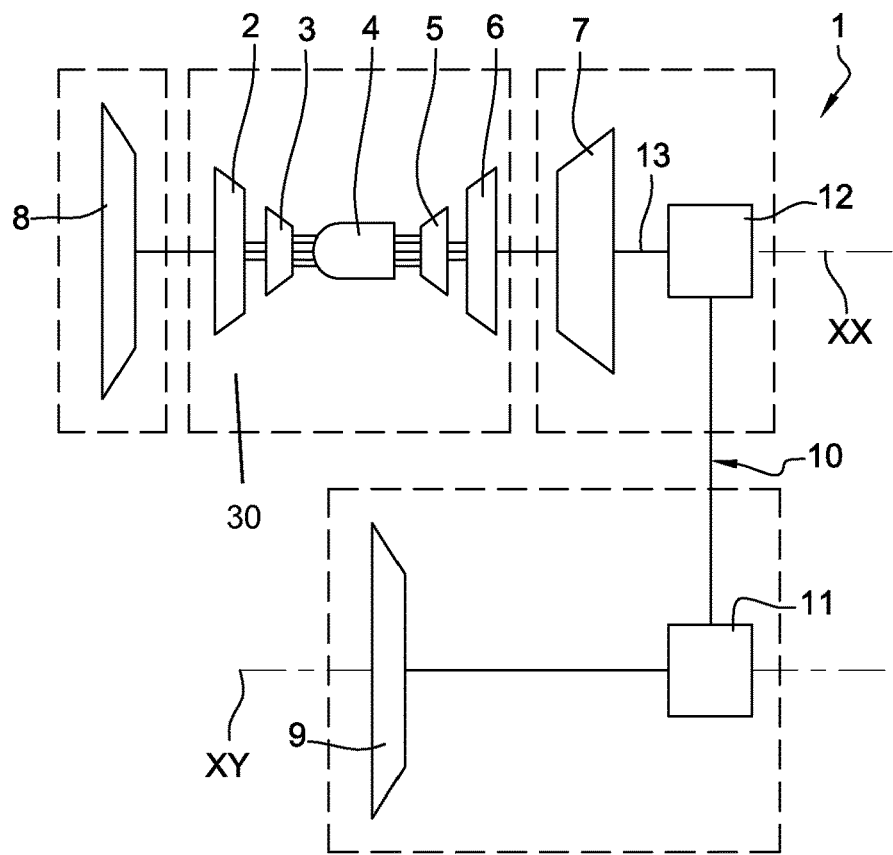
FIG. 4 shows a schematic representation of a variant of the first embodiment according to FIG. 3.

According to a variant of the preceding embodiment illustrated in FIG. 4, the main fan 8 is arranged upstream of the gas generator 30. The second power transmission system 12 is arranged downstream of the free power turbine 7 and is connected to the auxiliary fan 9, offset along the axis XY relative to the longitudinal axis XX. The second power transmission system 12 is connected mechanically to the first power transmission system 11. These first and second power transmission systems are arranged downstream of a plane perpendicular to the axis XX and downstream of the gas generator 30, and in particular of the free power turbine 7. The air intakes of the main and auxiliary fans are offset axially.

Figure 5:
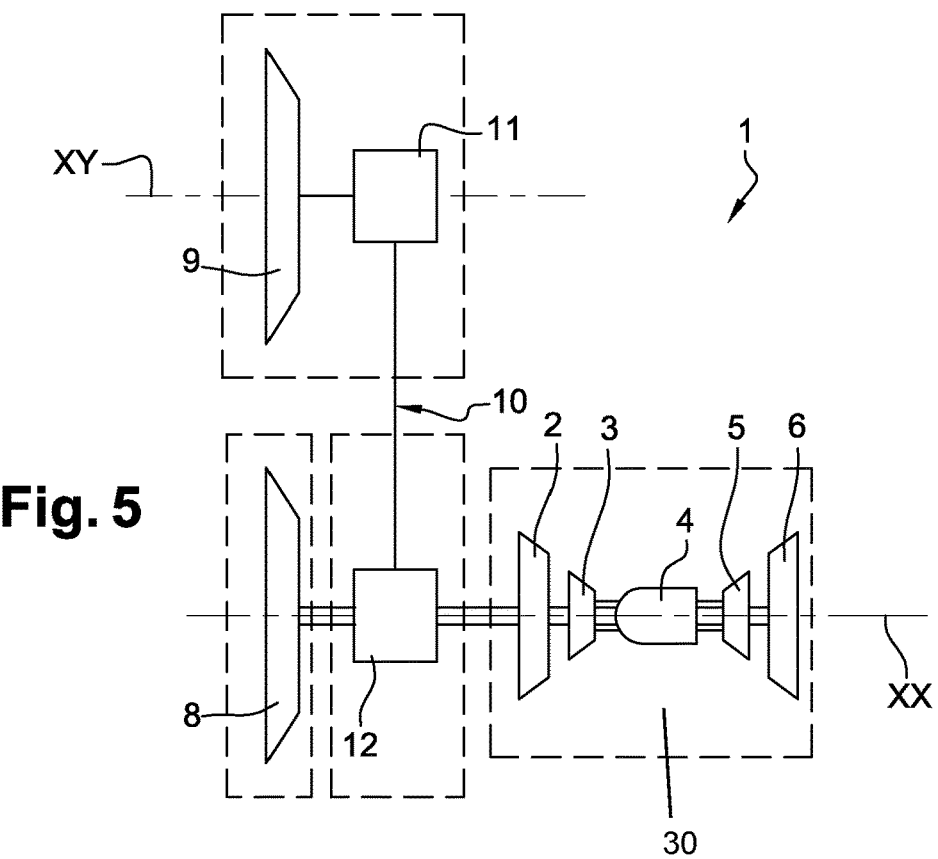
FIG. 5 shows a schematic representation of the arrangement of the auxiliary fan module according to another embodiment of the invention.

FIG. 5 shows another embodiment of a powerplant 1. The powerplant is arranged according to a configuration similar to that in FIGS. 12 and 13. In this figure, elements identical to those in FIGS. 2 and 12 are denoted by the same numerical references. The powerplant 1 comprises an LP spool and an HP spool mounted rotatably and independently on the longitudinal axis XX. The LP spool comprises an LP compressor 2 and an LP turbine 6 connected by a low-pressure shaft. An HP compressor 3 and an HP turbine 5 are arranged between the latter, forming the HP spool. The HP and LP spools form the gas generator 30. In this case it is a twin-spool gas turbine engine. A main fan 8, which comprises a fan rotor integral with the LP shaft of the LP compressor 2, is arranged upstream of the gas generator 30. The main fan 8 and the LP compressor 2 are driven in rotation by the LP turbine 6, called the main turbine.

An auxiliary fan 9 is also arranged along an axis XY offset relative to the longitudinal axis XX of the gas generator. The auxiliary fan 9 is driven by the LP shaft of the LP turbine via the first transmission system 11. The second power transmission system 12 is arranged between the LP compressor 2 and the rotor of the main fan 8. The intermediate shaft 10 connects the first power transmission system 11 and the second power transmission system 12 mechanically.

The first and/or second power transmission systems are similar to those presented in the first embodiment. The first and second transmission systems 11, 12 make it possible to effect an angular offset and optionally reduce the speed or distribute torques over several outputs. These first and second power transmission systems are arranged upstream of a plane perpendicular to the axis XX and upstream of the gas generator. The auxiliary fan is also arranged upstream of this plane. The air intakes of the main and auxiliary fans are arranged roughly in one and the same plane perpendicular to the axis XX.

Figure 6:
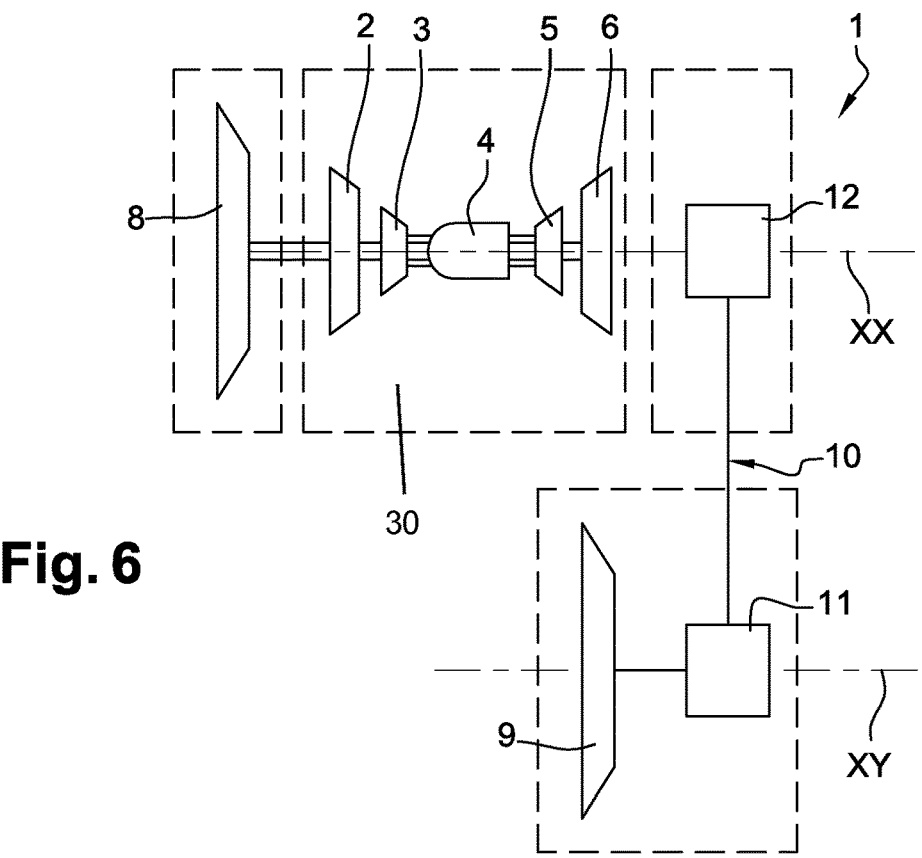
FIG. 6 illustrates schematically a variant of the embodiment according to FIG. 5.

According to a variant of the preceding embodiment illustrated in FIG. 6, the rotor of the main fan 8 is arranged upstream of the gas generator 30, in particular of the LP compressor 2. The rotor of the fan 8 is integral with the shaft of the LP compressor 2 and is driven directly by the LP turbine. An auxiliary fan 9 is arranged along an axis XY offset relative to the longitudinal axis XX of the gas generator 30. The second power transmission system 12 is arranged downstream of the LP turbine. The latter is connected mechanically to the first power transmission system 11 via the intermediate shaft 10. More precisely, the first and second power transmission systems are arranged downstream of a plane perpendicular to the axis XX and downstream of the gas generator 30, and in particular of the free power turbine 7. The air intakes of the main and auxiliary fans are offset axially.

Figure 7:
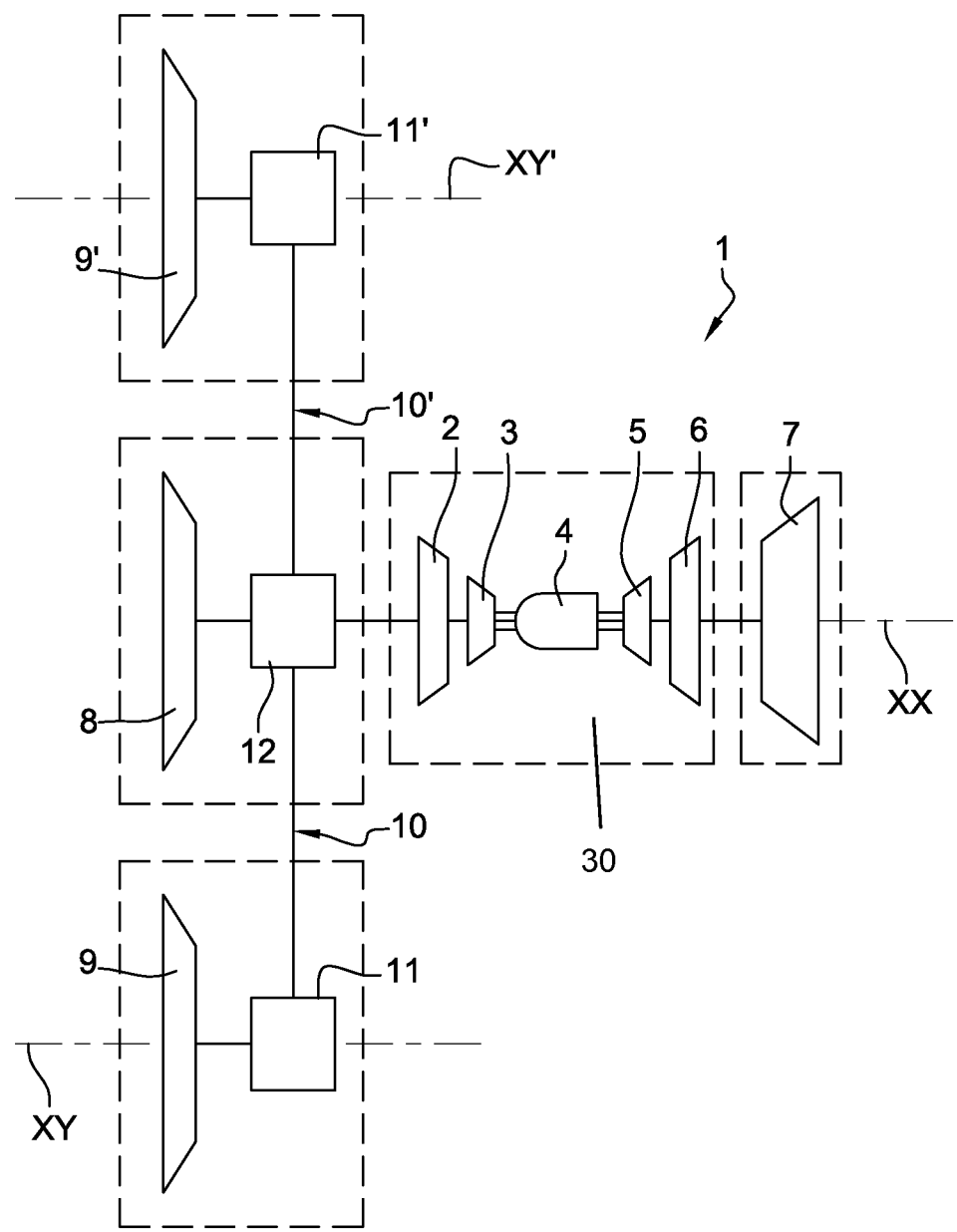
FIG. 7 is a schematic representation of another embodiment with an arrangement of two auxiliary fan modules offset relative to a gas generator, upstream of which a main fan is installed.

According to yet another embodiment illustrated in FIG. 7, the powerplant 1 comprises an HP spool and an LP spool forming the gas generator 30 on the longitudinal axis XX. A free power turbine 7 is also arranged along the axis XX and downstream of the LP turbine. The free power turbine 7 is driven in rotation by the gases from the gas generator independently of the LP and HP spools. Three fans are arranged upstream of the compressor of the gas generator. In particular, the powerplant 1 comprises a main fan 8 mounted upstream of the gas generator and driven by the turbine 6 on the axis XX. Two auxiliary fans 9, 9' are arranged on either side of the main fan 8. The auxiliary fans 9, 9' are each mounted respectively on an axis XY and XY' offset relative to the longitudinal axis XX. The air intakes of the main and auxiliary fans are arranged roughly in one and the same plane perpendicular to the axis XX. The auxiliary fans 9, 9' are driven in rotation by the free power turbine 7. Each rotor of the auxiliary fans 9, 9' is connected mechanically to a first power transmission system 11, 11'. The rotor of the main fan 8 is connected mechanically to the second power transmission system 12 arranged upstream of the LP compressor 2. First and second radial intermediate shafts connect the first power transmission systems 11, 11' respectively to the second power transmission system 12.

The first and/or second power transmission systems are similar to those presented in the first embodiment. The first and second transmission systems 11, 12 make it possible to effect an angular offset and optionally reduce the speed or distribute torques over several outputs. The first and second power transmission systems are arranged upstream of a plane perpendicular to the axis XX and upstream of the gas generator. The auxiliary fans are also arranged upstream of this plane.

Figure 8:
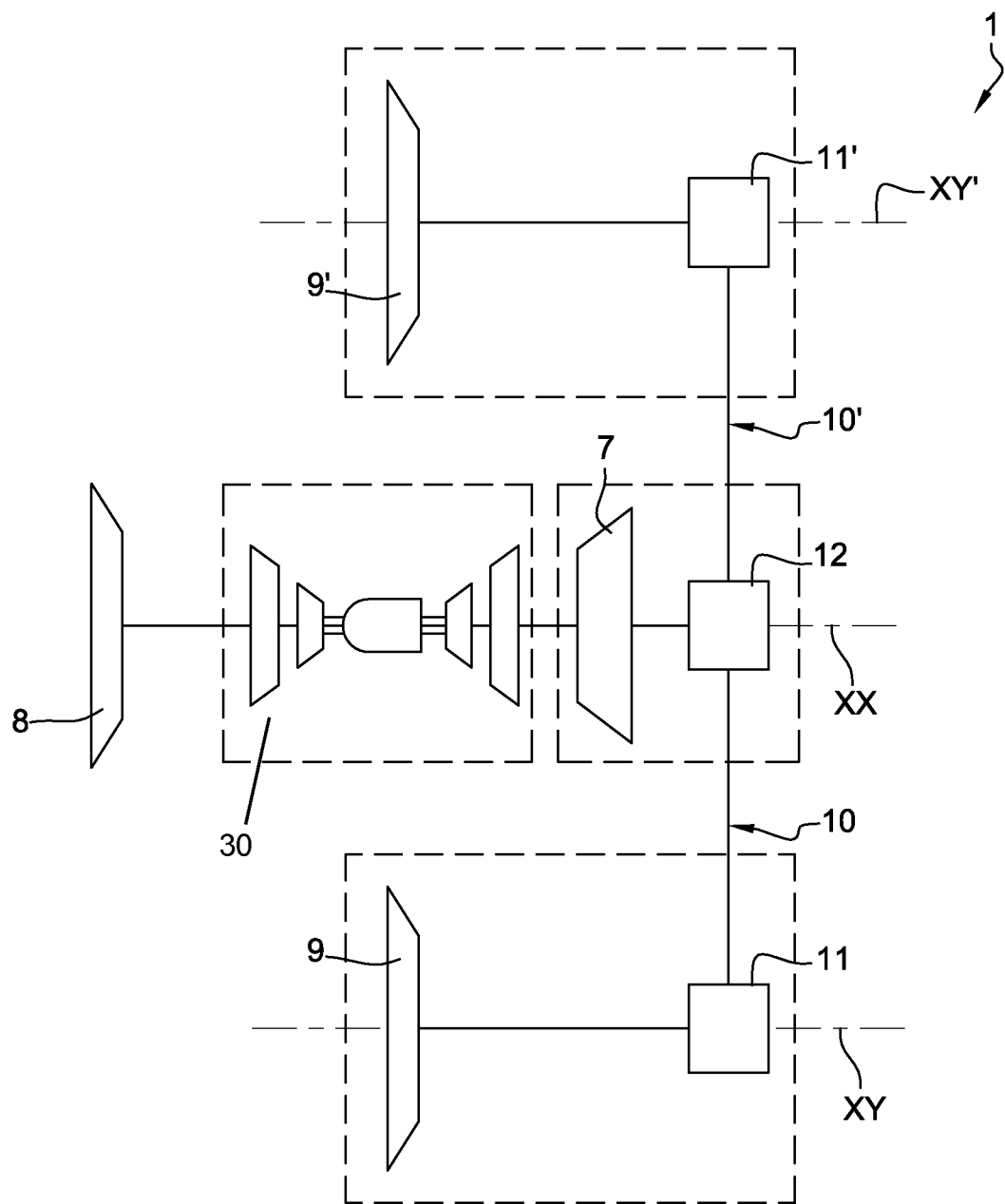
FIG. 8 illustrates schematically a variant of the embodiment according to FIG. 7.

According to a variant of the preceding embodiment illustrated in FIG. 8, the powerplant also comprises three fans. The main fan is arranged upstream of the gas generator and is driven in rotation by the turbine 6 on the longitudinal axis XX. The two auxiliary fans 9, 9' are mounted respectively following the axes XY, XY' offset relative to the axis XX. Here, the air intakes of the main and auxiliary fans are offset axially. The air intakes of the auxiliary fans are approximately in the same plane. The second power transmission system 12 is arranged downstream of the free power turbine 7. The auxiliary fans 9, 9' are driven by the power shaft of the free power turbine 7 via the first power transmission systems 11, 11'. The first power transmission systems 11, 11' of the offset auxiliary fans 9, 9' are connected mechanically to the second power transmission system 12 via the intermediate shafts 10, 10'. The first and second power transmission systems are arranged downstream of a plane perpendicular to the axis XX and downstream of the gas generator 30, and in particular of the free power turbine 7.

Figure 9:
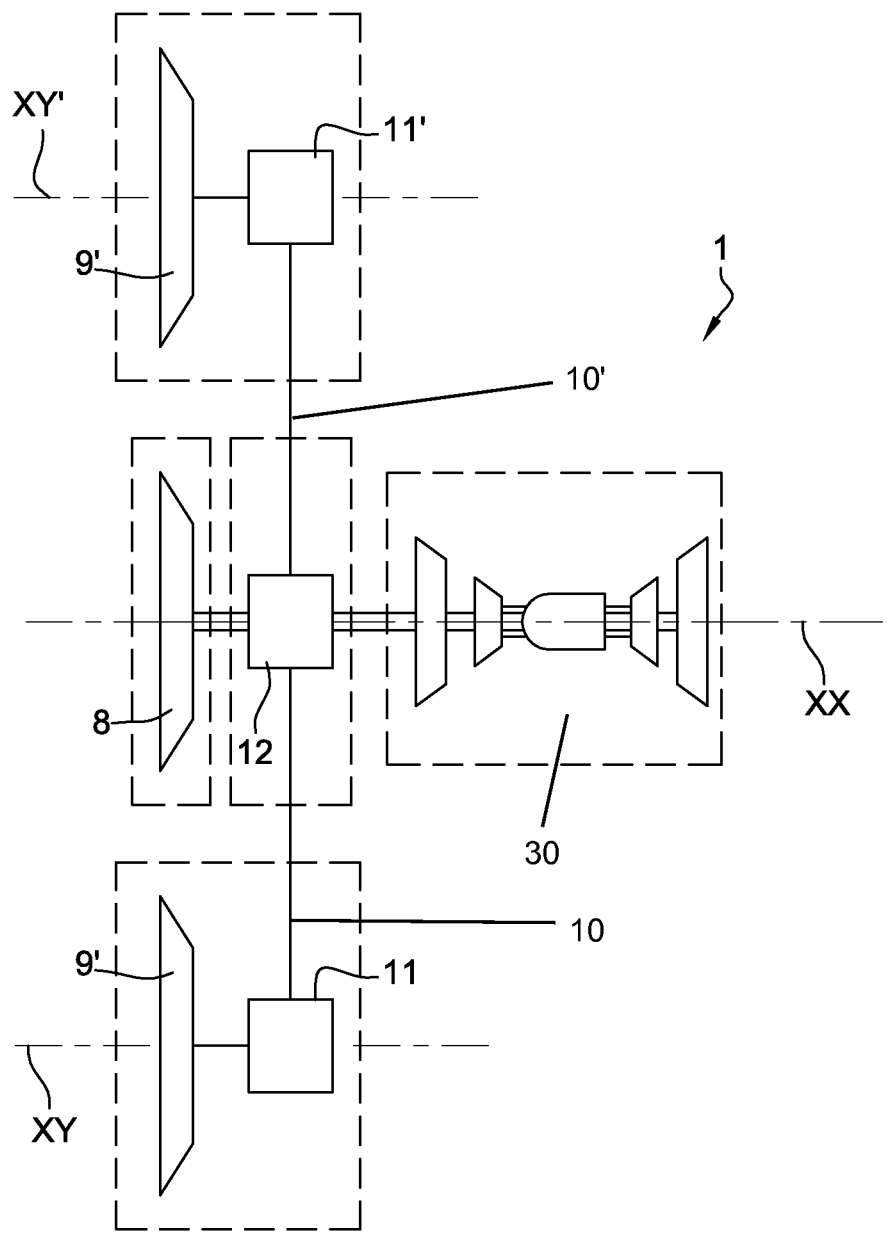
FIG. 9 is a schematic view of another embodiment of the invention in which two fan modules are offset relative to the axis of a twin-spool gas generator, upstream of which a main fan is installed.

FIG. 9 shows another embodiment of a powerplant. Here, the assembly comprises an HP spool and an LP spool forming a gas generator 30. In this example the LP turbine is an auxiliary turbine. The rotor of the main fan 8 is integral with the LP shaft of the LP compressor and is driven by the LP turbine. The second power transmission system 12 is mounted upstream of the LP compressor and is connected to two offset auxiliary fans 9, 9'. In particular, each auxiliary fan 9, 9' is connected to a first power transmission system 11, 11' connected in their turn to the second power transmission system 12 via intermediate shafts 10, 10'. The auxiliary fans are driven by the LP turbine.

The first and/or second power transmission systems are similar to those presented in the first embodiment. The first and second transmission systems 11, 12 make it possible to effect an angular offset and optionally reduce the speed or distribute torques over several outputs. The first and second power transmission systems are arranged upstream of a plane perpendicular to the axis XX and upstream of the gas generator. The auxiliary fans are also arranged upstream of this plane.

Figure 10:
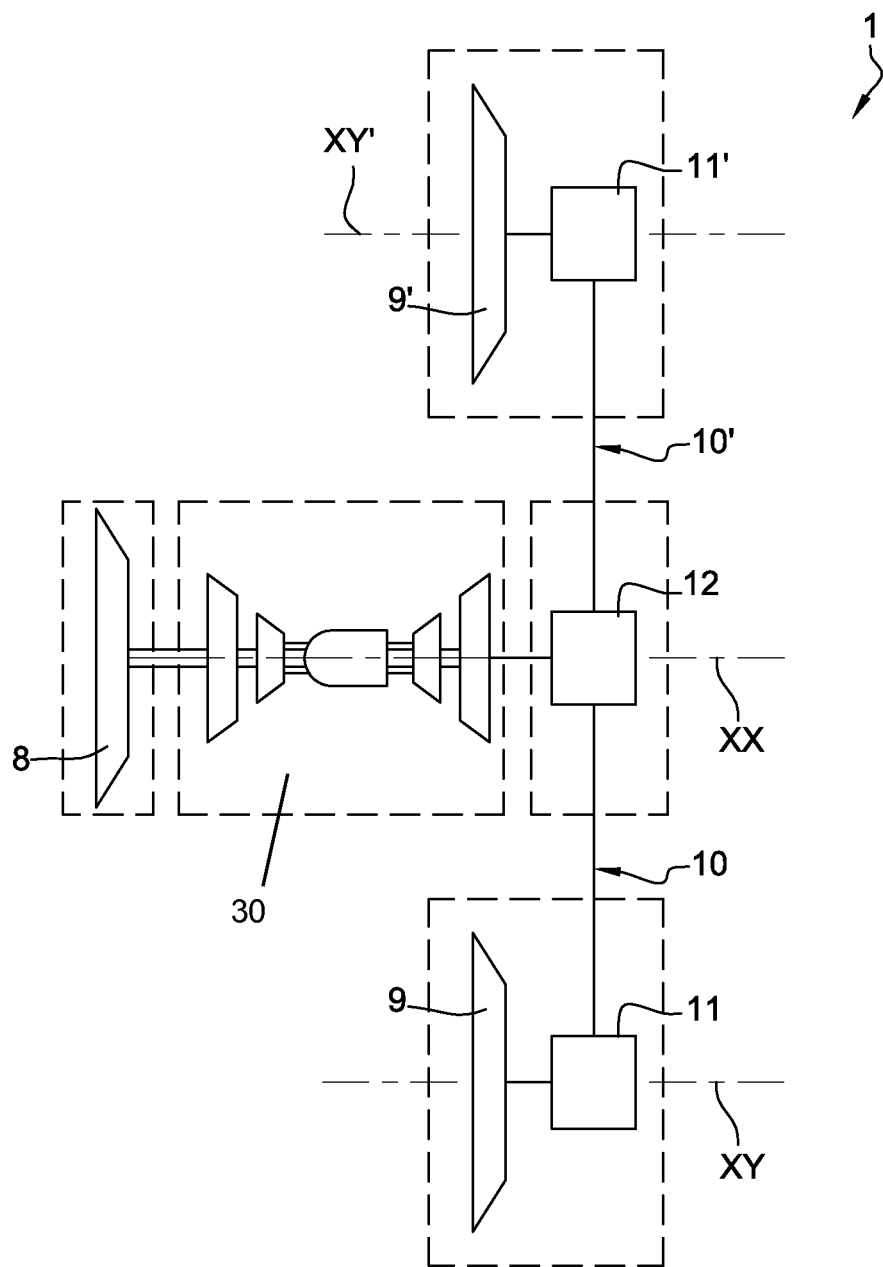
FIG. 10 is a variant of the embodiment according to FIG. 9.

According to a variant of the preceding embodiment illustrated in FIG. 10, the rotor of the main fan is arranged upstream of the gas generator 30. The second power transmission system 12 is arranged downstream of the LP turbine. The latter is connected mechanically to two auxiliary fans 9, 9' mounted on an axis offset relative to the axis XX of the gas generator 30 via first power transmission systems 11, 11'.

Thus, these various configurations make it possible to simplify the design of a distributed propulsion unit while preserving a known architecture in which at least one additional fan module is incorporated. The ejection airflow from the generator is covered by the ejection airflow of the main fan, the delta of reduced velocity between the two ejection airflows makes it possible to reduce the effect of shearing of the layers of air and greatly reduce the perceived jet noise. This configuration also makes it possible to meet the current and future aeronautical acoustic standards.

Alternatively, the turbine engine may be arranged on the wing whereas the fan 9 is under the wing. There are the same elements as in the embodiment in FIG. 2, but reversed with respect to the wing 20.

The invention claimed is:

1. A powerplant assembly of an aircraft comprising:
   at least one twin-spool gas generator of longitudinal axis (XX);
   at least one main fan arranged upstream of the at least one twin-spool gas generator on the longitudinal axis (XX) and driven in rotation by the at least one twin-spool gas generator, said at least one main fan being shrouded with a main fan housing; and
   at least one auxiliary fan with axis (XY, XY') offset relative to the longitudinal axis (XX) and driven by the at least one twin-spool gas generator, the at least one auxiliary fan being shrouded with an auxiliary fan housing,
   the at least one twin-spool gas generator comprising at least one low-pressure compressor and a low-pressure turbine connected by a low-pressure shaft, the low-pressure turbine driving in rotation the at least one main fan and the at least one auxiliary fan via at least one power transmission system comprising a differential gear system incorporating a bevel gear
   wherein the differential gear system comprises a planetary gear train.

2. The powerplant assembly according to claim 1, wherein the planetary gear train comprises at least one ring gear driving the at least one main fan and a planet carrier driving the at least one auxiliary fan.

3. The powerplant assembly according to claim 1, wherein the at least one power transmission system comprises a second power transmission system comprising the differential gear system arranged between the gas generator and the at least one main fan.

4. The powerplant assembly according to claim 3, wherein the at least one power transmission system comprises a first power transmission system connected to the at least one auxiliary fan, the second power transmission system being connected to the first power transmission system.

5. The powerplant assembly according to claim 1, wherein the first and/or second power transmission system comprises, in series, two double universal joints with a slide connection.

6. The powerplant assembly according to claim 1, wherein the at least one auxiliary fan is driven by the low-pressure turbine via an intermediate layshaft.

7. The powerplant assembly according to claim 6, wherein the intermediate layshaft comprises a first shaft and a second shaft, which are connected to one another by a coupling.

8. The powerplant assembly according to claim 1, wherein the main housing is separate and distinct from the auxiliary housing so as to generate a main secondary airflow and an auxiliary secondary airflow, respectively, which are independent until they are discharged to atmosphere.

9. The powerplant assembly according to claim 1, wherein it comprises stator blades arranged downstream of the at least one main fan, the stator blades each having a top end fixed to the main fan housing or auxiliary fan housing and a structural nature of transmission of forces so as to hook up the first or the second power transmission system.

10. The powerplant assembly according to claim 1, wherein the at least one main fan and the gas generator form a turbine engine, the turbine engine being fixed under the wing and the at least one auxiliary fan being fixed on the wing, the axis of the turbine engine and of the at least one auxiliary fan being located in one and the same vertical plane.

11. The powerplant assembly according to claim 1, wherein it comprises two auxiliary fans driven by the low-pressure turbine.

12. The powerplant assembly according to claim 1, wherein the turbine engine is a multiflow turbojet.

13. The powerplant assembly according to claim 10, wherein the turbine engine and the at least one auxiliary fan are mounted on the wing by means of a pylon.

14. The powerplant assembly according to claim 10, wherein the at least one auxiliary fan is located in said vertical plane.

15. The powerplant assembly according to claim 1, wherein it comprises a free power turbine driven by the gas generator, the gas generator comprising the low-pressure turbine and driving in rotation the at least one auxiliary fan.

* * * * *